United States Patent [19]
Rotondi

[11] 3,785,893
[45] Jan. 15, 1974

[54] METHOD FOR MANUFACTURING BELTS

[75] Inventor: Paul C. Rotondi, Cliffside Park, N.J.

[73] Assignee: Dan Dee Belt & Bag Company, Inc., Hoboken, N.J.

[22] Filed: Jan. 27, 1972

[21] Appl. No.: 221,145

[52] U.S. Cl.............. 156/198, 2/243 R, 156/203, 223/39, 223/42
[51] Int. Cl............................................ B29c 17/00
[58] Field of Search................... 156/198, 200, 201, 156/203, 204, 289, 294; 2/358, 311, 243 R; 223/40–42

[56] References Cited
UNITED STATES PATENTS 2,480,207  8/1949  Adelman.............................. 223/40
2,926,699  3/1960  Wulms............................ 156/289 X Primary Examiner—Alfred L. Leavitt
Assistant Examiner—David A. Simmons
Attorney—Charles E. Baxley et al.

[57] ABSTRACT

This invention is directed to a method for manufacturing glossy surfaced flat tubular plastic belts in which a belt tube having one end closed is formed with the glossy side in and inverted by being fitted over the closed end of a fabric sock and then the closed ends of both pieces are forced through and along the body of the sock, after which the sock is stripped from the inverted belt tube. The sock prevents contact between opposed portions of the glossy surface.

4 Claims, 13 Drawing Figures

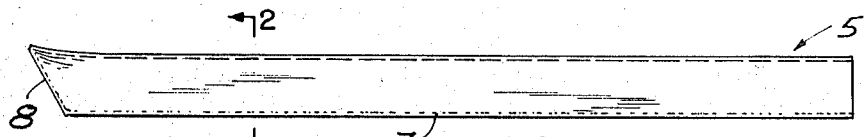
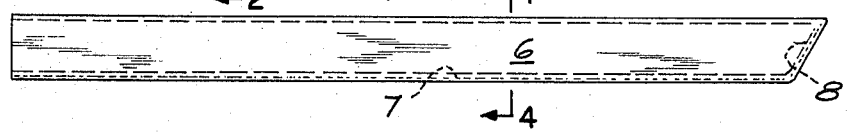
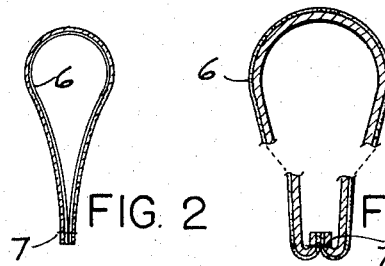
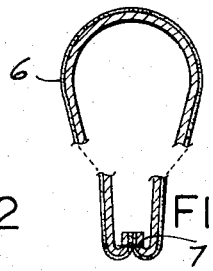
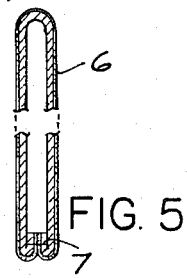
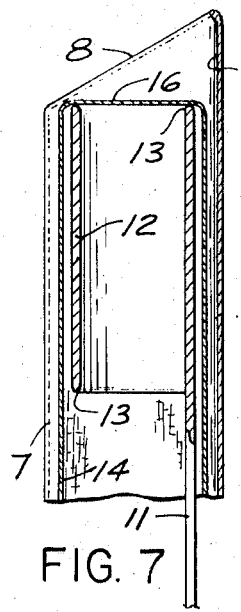
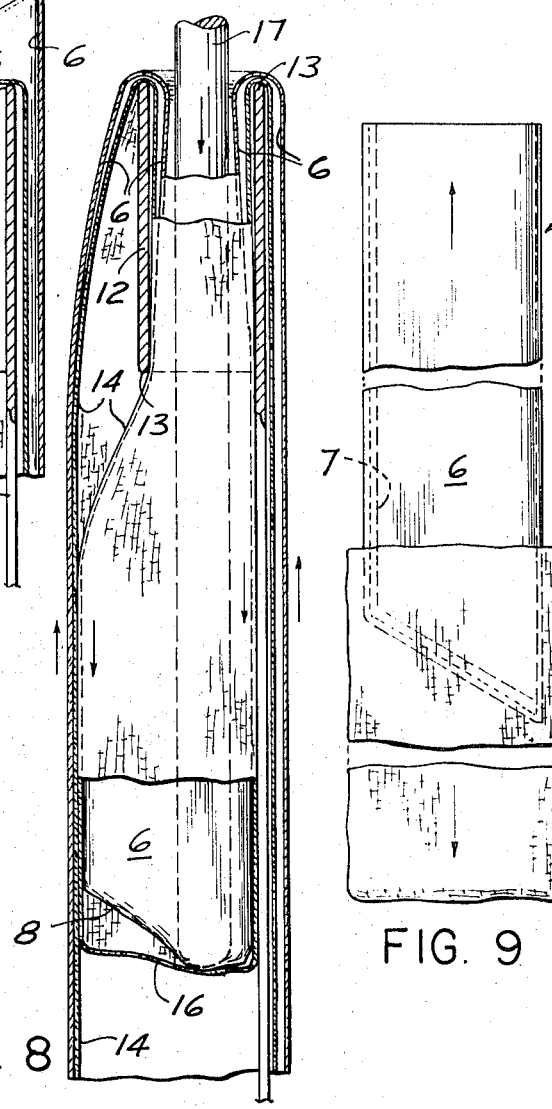
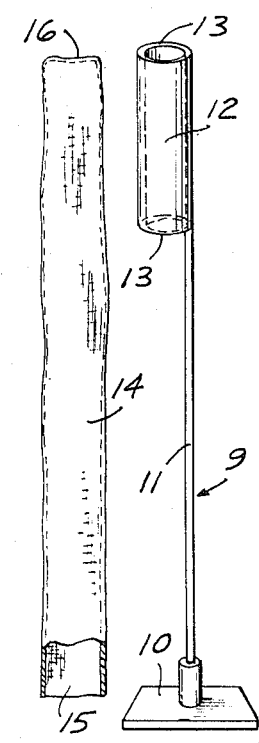
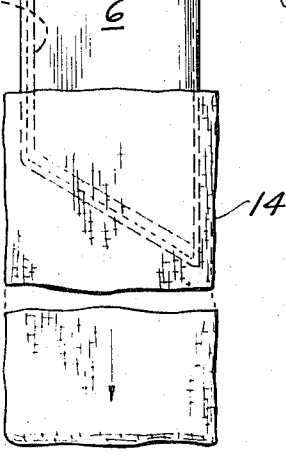

METHOD FOR MANUFACTURING BELTS

THE INVENTION

This invention relates generally to new and useful improvements in the manufacture of belts and particularly seeks to provide a novel method of manufacturing flat tubular women's belts from sheet plastic in such a manner that the edge seam and one end seam in the finished belt blank are blind and the fabrication is effected without abrading or otherwise marring the ultimate outer surface.

Heretofore, in the manufacture of women's belts from a sheet plastic, such as vinyl, it has been common practice to cut a blank, bend it in half around its median longitudinal axis with the finished surface facing inward, stitch or heat seal the free longitudinal edges and the free edges at one end, and then turn the tube inside out to expose the finished surface by pushing the closed end of the tube back through the tube until it has become completely reversed.

This prior practice is completely unsatisfactory when the belts are to be fabricated from a plastic material in which the ultimate exposed surface has a glossy finish because that surface, which is the inner face of the tube when it is first formed, will rub against itself when the tube is reversed and will abrade or otherwise mar the surface.

However, belts manufactured in accordance with this invention avoid any rubbing action between the inner surfaces of the initially formed tube as it is being reversed, thus enabling the use of gloss finished plastics without the glossy surface becoming abraded or otherwise marred.

Therefore, an object of this invention is to provide a novel method of fabricating flat tubular blanks for women's belts in which the edge seam and one end seam in the finished blank are blind as the result of reversing an initially formed tube and which includes means for preventing the inner surfaces of the initially formed tube from contacting each other during reversal of the tube whereby to eliminate the abrading or marring of such surfaces which become the outer surfaces of the finished blank.

Another object of this invention is to provide a method of the character stated in which a flat blank of sheet plastic having one glossy surface is first bent in half along its median longitudinal axis with the glossy surface facing inward, then the free longitudinal edges and the edges at one end are stitched or heat sealed together, then the tube is fitted over a cloth sock-covered open ended tubular form, with the closed ends of the sock and of the plastic tube at one end of the form, and a core rod or mandrel is used to push the closed ends of both pieces into and through the tubular form to reverse the tube without permitting the glossy surfaces of the plastic to rub against each other since the cloth sock progressively becomes interposed therebetween as the tube reversal takes place.

A further object of this invention is to provide a method of the character stated in which the reversed plastic tube is subjected to a heat treatment to set it into its desired final cross-section configuration.

With these and other objects, the nature of which will be apparent, the invention will be more fully understood by reference to the drawings, the accompanying detailed description and the appended claims.

In the drawings:

FIG. 1 is a side elevation of an initially formed tubular belt blank;

FIG. 2 is an enlarged vertical transverse section taken along line 2—2 of FIG. 1;

FIG. 3 is a side elevation of the reversed tubular belt blank;

FIG. 4 is an enlarged vertical transverse section taken along line 4—4 of FIG. 3;

FIG. 5 is a view similar to FIG. 4 but showing the final cross-sectional configuration of the finished belt blank;

FIG. 6 is a laterally exploded view, partly in section, showing the equipment for reversing ot turning the tube blank of FIG. 1 inside out;

FIG. 7 is an enlarged vertical transverse section showing the top (closed end) of the tubular belt blank as it appears at the start of the reversing operation;

FIG. 8 is a view generally similar to FIG. 7 but showing the reversing operation at a more advanced stage;

Figure 10:
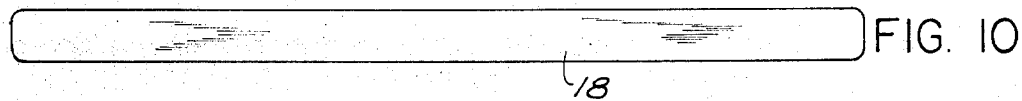
Figure 11:
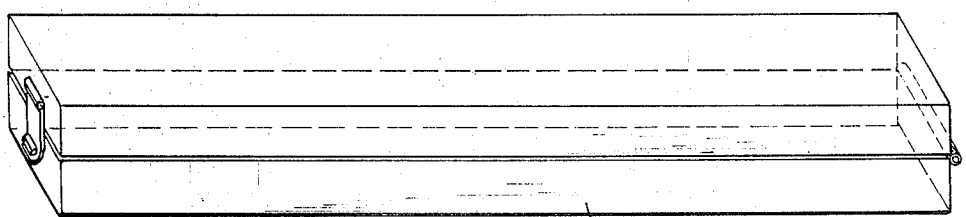
Figure 12:
Figure 13:
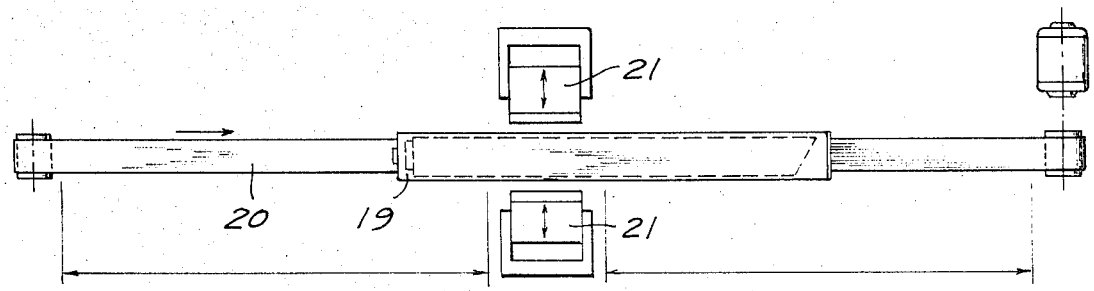

FIG. 9 indicates the separation of the belt blank and covering sock after tube reversal has been completed;

FIG. 10 is a side elevation of a flat mandrel for the heat forming or setting step;

FIG. 11 is a perspective view of a quick-release clamp for the heat setting step;

FIG. 12 is a side elevation showing the insertion of the mandrel into the reversed tube blank; and FIG. 13 is a somewhat schematic top plan view showing the heat setting step.

Referring to the drawings in detail the invention, as illustrated, involves the manufacture of flat tubular belt blanks from sheet plastic material having a smooth glossy finish on that surface that is to become the outer surface of the finished blank.

To this end, a long generally rectangular blank generally indicated at 5 is median folded lengthwise with the glossy surface 6 on the inside. The free longitudinal edges are joined by a line of stitching 7 and the free edges at one end are joined by a similar line of stitching 8, thus defining a tube open at one end and having a general cross-section as shown in FIG. 2.

In order to prepare the tube for final finishing operations it is necessary to invert same so that the stitching will be hidden and the glossy surface 6 will be exposed. If this were done simply by turning the tube inside out, opposed portions of the glossy surfaces 6 would rub against each other with consequent damage to at least portions of those surfaces.

In further accordance with this invention means are provided for inverting the tube in such a manner that face to face contact between portions of the glossy surfaces 6 is prevented and damage thereto is avoided.

To this end there is provided an inverting stand generally indicated 9 that includes a base 10 to which is affixed a vertical post 11 carrying at its upper end a relatively short sleeve 12 having rounded smooth end edges 13,13. The diameter of the sleeve 12 is such that the belt tube will fit freely thereover.

A long cotton sock 14, having an open end 15 and a closed end 16, is dimensioned to fit over the sleeve 12 and post 11 and within the belt tube.

To invert the belt tube (see FIGS. 7 and 8) the sock 14 is fitted over the sleeve 12 and post 11 with its closed end 16 resting on the top of the sleeve and its open end 15 hanging down in proximity to the base 10. The belt tube is then fitted over the sock 14 with its closed end 8 in juxtaposition to the closed end 16 of the sock. A ramrod 17 is then pushed down through the sleeve 12 against the closed ends of the belt tube and sock to progressively invert both the tube and the sock by drawing same upwardly around the outside of the sleeve and downwardly therethrough. In this manner, the closed ends of both the belt tube and the sock are progressively forced through the interior of the length of the sock to invert or turn inside-out both the belt tube and the sock. The sock 14, being within the tube, prevents any portion of the glossy surface 6 from contacting any other portion of that surface or the sleeve 12.

At the end of the inverting step the sock 14 is on the outside of the belt tube, and is simply stripped therefrom, after the ramrod 17 has been removed, as indicated in FIG. 9, leaving the glossy surface 6 thereof exposed and undamaged. At this stage the general cross-section of the belt tube is as indicated in FIG. 4 of the drawings, and the belt tube must be flattened to its permanent configuration as indicated in FIG. 5.

This permanent flattening (see FIGS. 10–13) is effected by inserting a flat mandrel or forming board 18 into the belt tube to force same into a flattened condition and then placing the assembly into a quick-release block clamp 19 with the lateral edges of the belt tube exposed. Then the clamped assembly is passed by a conveyor 20 between a pair of laterally adjustable heaters 21,21 to relax and set the edges of the belt tube so that it will remain in its permanently flattened condition, after which the clamp 19 is opened and the belt tube is removed for subsequent finishing operations.

I claim:

1. In a method of manufacturing tubular plastic belts the steps of, forming a plastic belt tube having one end closed, providing a fabric sock having one end closed, fitting said belt tube over said sock with the closed ends of each in juxtaposition, and then inverting both said belt tube and sock by progressively forcing the closed ends of said belt tube and said sock interiorly through the length of said sock.

2. The method of claim 1 additionally including the step of stripping said sock from said belt tube after both have been inverted.

3. The method of claim 2 additionally including the steps of flattening said belt tube after said sock has been stripped therefrom and then exposing the lateral edges of said flattened belt tube to heat to relax the plastic material of said belt tube and set same in a permanently flattened condition.

4. The method of claim 3 in which said forming step comprises forming said belt tube from a blank of sheet plastic having a glossy finish on one surface by median folding said blank lengthwise with said glossy surface on the inside, and then securing together the free longitudinal edges of said belt tube as well as the free edges at one end thereof.

* * * * *